UNITED STATES PATENT OFFICE.

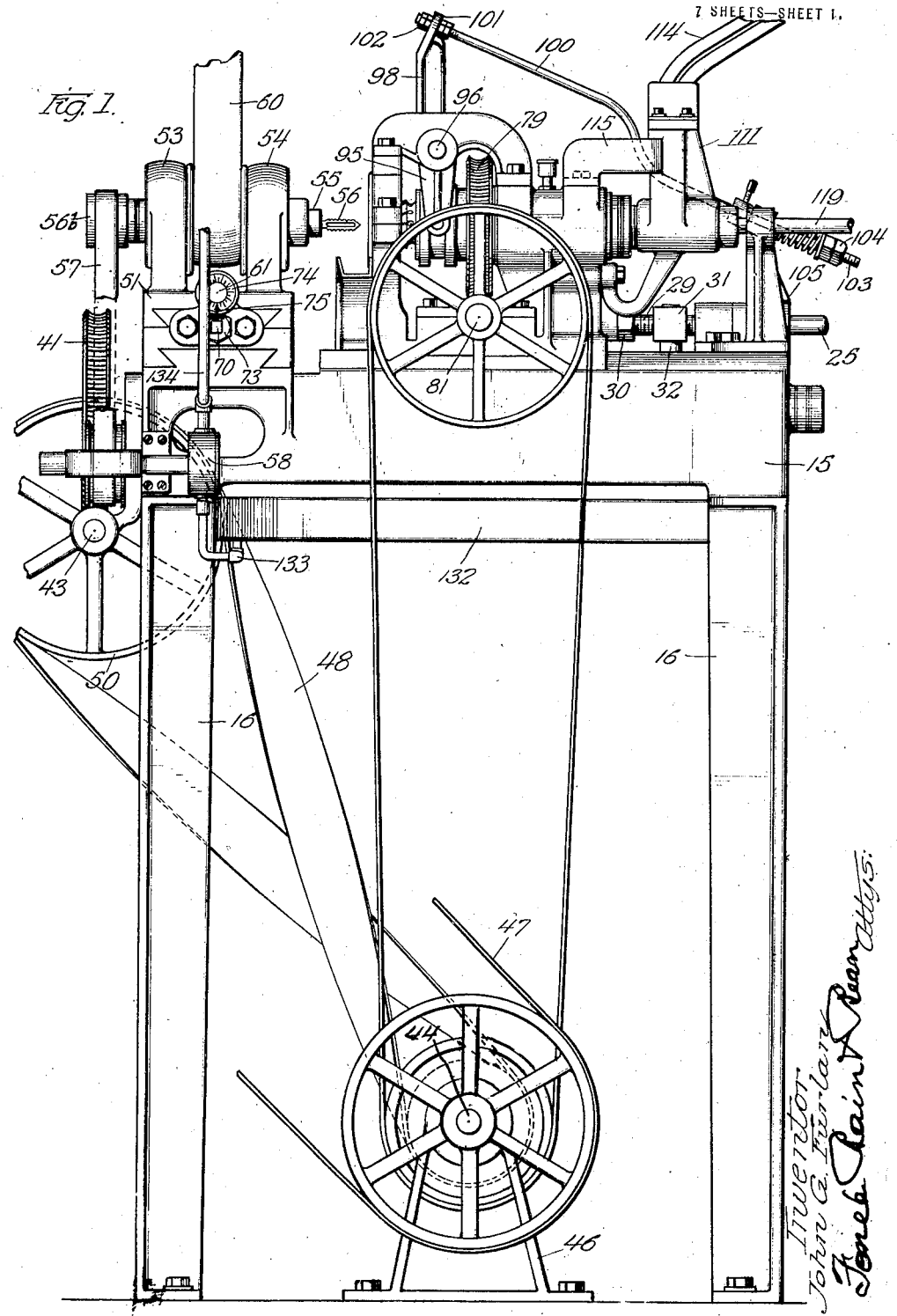

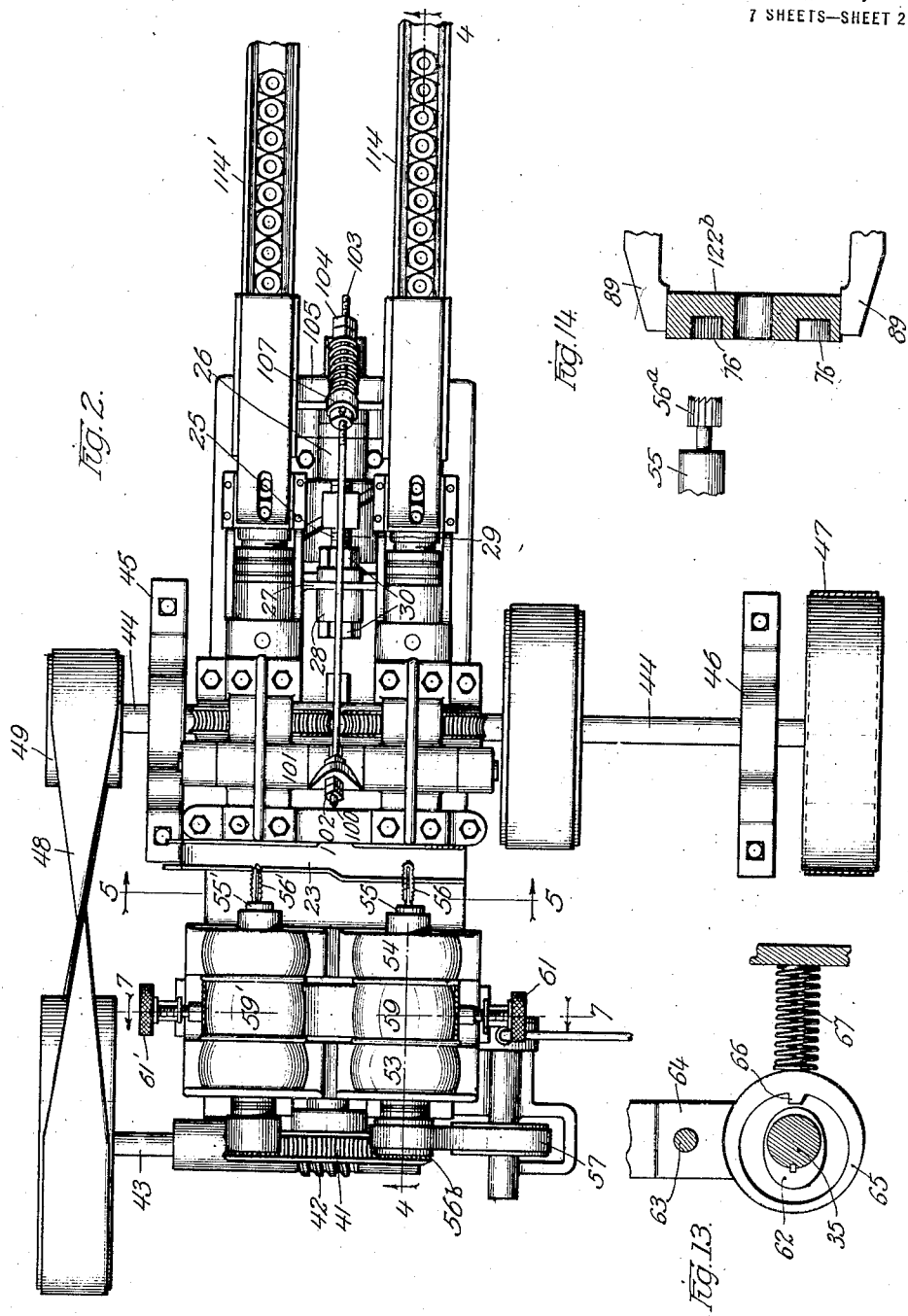

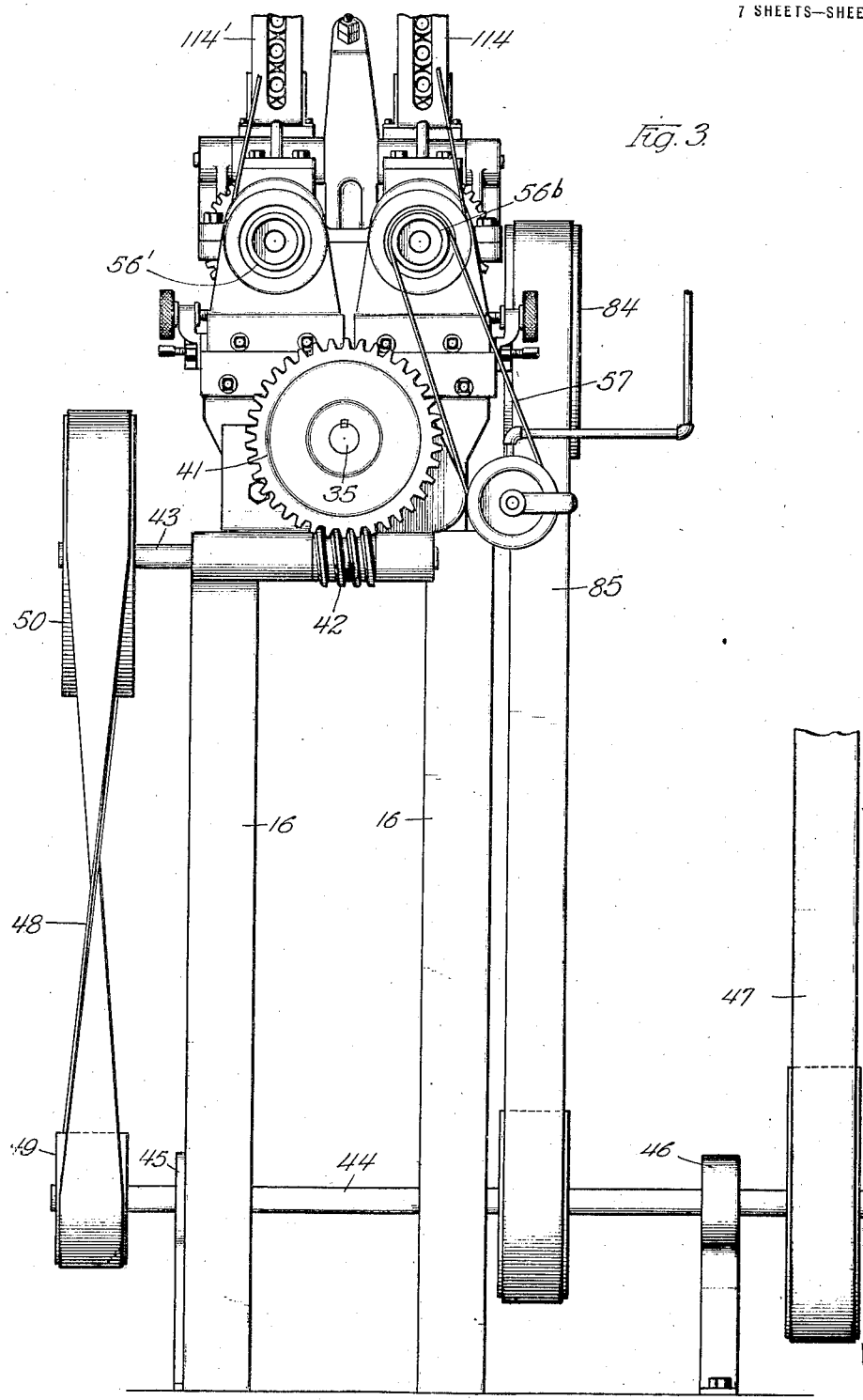

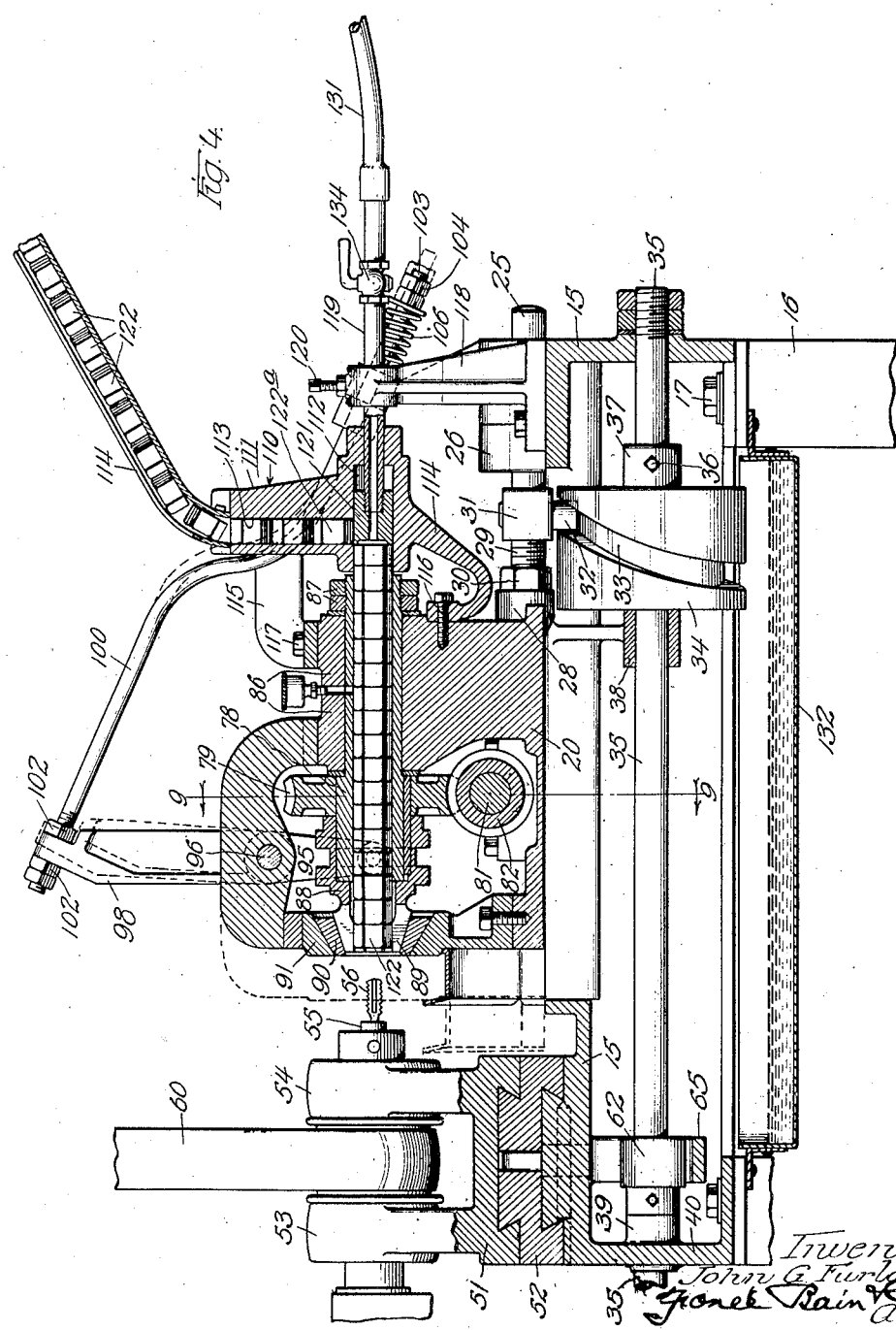

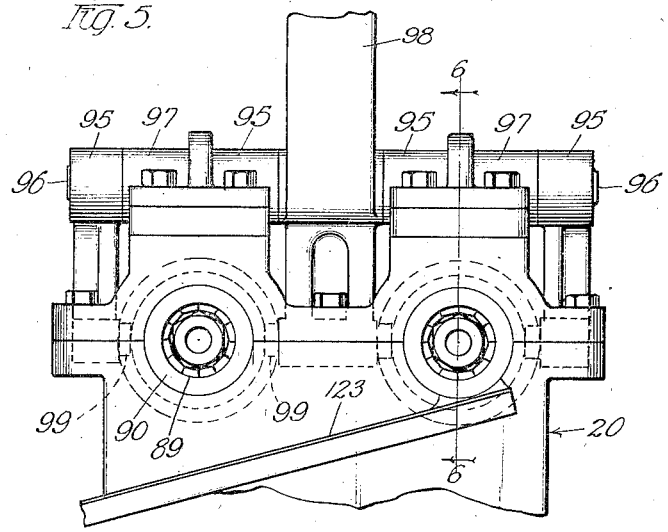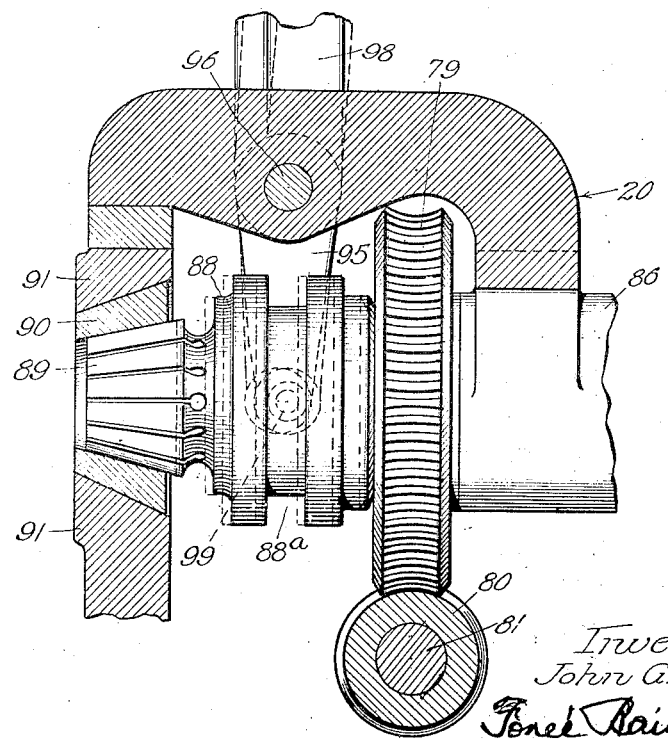

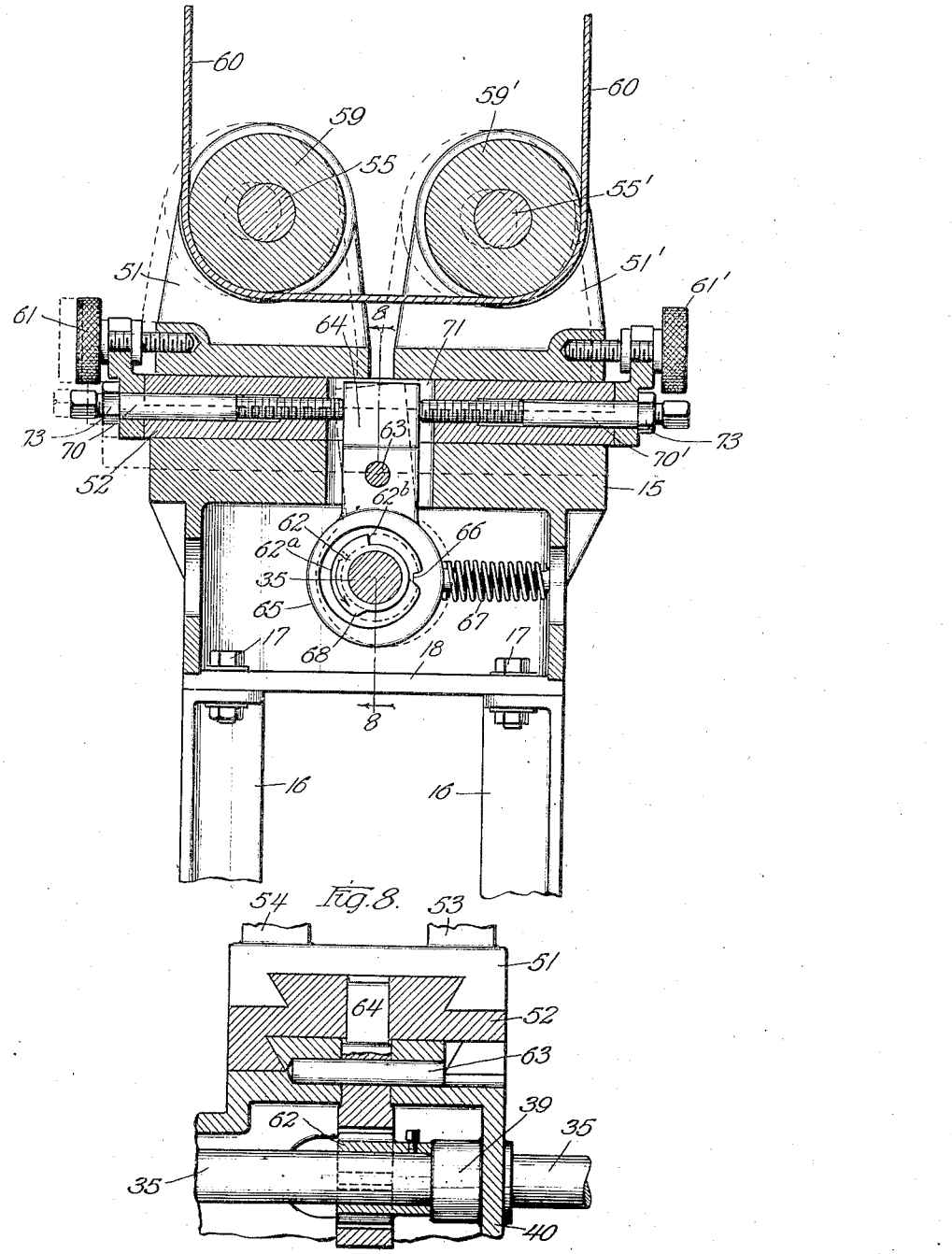

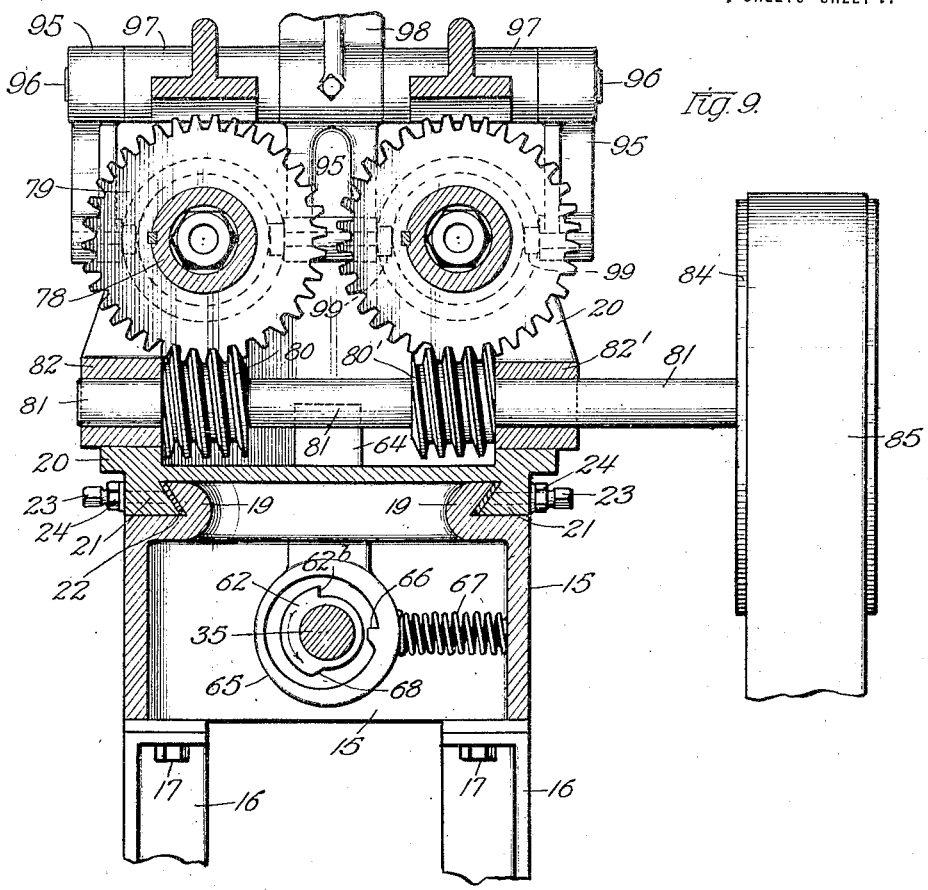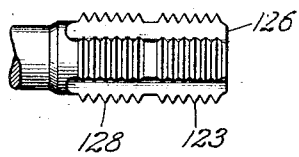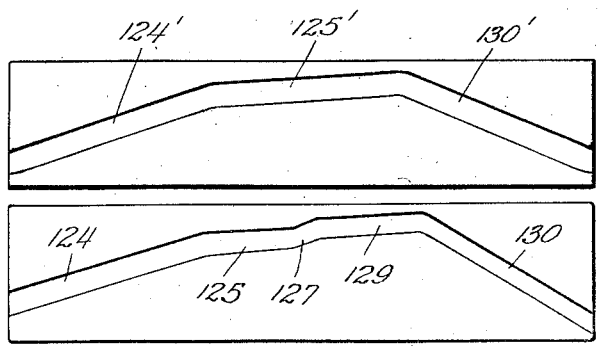

JOHN G. FURLAN, OF CHICAGO, ILLINOIS, ASSIGNOR, BY MESNE ASSIGNMENTS, TO MARYE SAFETY NUT CORPORATION.

MILLING MACHINE.

1,411,718.  Specification of Letters Patent.  Patented Apr. 4, 1922.

Application filed December 28, 1918. Serial No. 268,753.

*To all whom it may concern:*

Be it known that I, JOHN G. FURLAN, a subject of the Emperor of Austria, residing at Chicago, in the county of Cook and State of Illinois, have invented certain new and useful Improvements in Milling Machines, of which the following is a specification.

My invention relates to improvements in milling machines and has especial reference to automatic machines of this character, in which all of the operations are automatically performed in milling threads in nuts, and the like.

One of the objects of my invention is to provide an automatically operating machine that will rapidly and effectively mill screw threads, on or in objects to be threaded; that is capable of producing the regular, normal uniform threads of any desired diameter, pitch and numerical amplitude, and any desired anomalous or irregular threads or grooves, and which will continue to reproduce the characteristics of the work for which it has been adjusted.

Another object of my invention is to provide in a machine of the character described, means for consecutively feeding the objects to be tooled, to the machine to permit the machine to automatically engage the objects and to discharge them after the accomplishment of the milling operation.

And still another object of my invention is to provide a machine that will mill, in a series of objects in consecutively sequential order, a sinuous cam groove or projection, within the bore or face of the object, to thereby automatically produce a series of like cams or the like.

Other and further objects of my invention will become readily apparent to persons skilled in the art, from a consideration of the following description when taken in conjunction with the drawings, wherein:—

Fig. 1 is a side elevation of a double machine or two machines arranged for coincident operation.

Fig. 2 is a plan view thereof.

Fig. 3 is an end elevation of the machine.

Fig. 4 is a longitudinal section on line 4—4 of Fig. 2.

Fig. 5 is an end view in elevation of an upper part of the machine, looking in the direction of the arrows pointing on line 5—5 of Fig. 2.

Fig. 6 is an enlarged section taken on line 6—6 of Fig. 5.

Fig. 7 is a transverse sectional view taken on line 7—7 of Fig. 2.

Fig. 8 is a section taken on line 8—8 of Fig. 7.

Fig. 9 is a section taken on line 9—9 of Fig. 4.

Fig. 10 is a protracted flat view of the cam that advances the work to the tool.

Fig. 11 shows one modification of the cam for producing anomalous threads in a nut, or for making irregular cams, or the like.

Fig. 12 is an enlarged elevation of the milling tool shown in Fig. 4.

Fig. 13 is a modification of the cam for transversely moving the tool with respect to the work, for fashioning irregular formed objects, such as the work shown in Fig. 14.

Fig. 14 shows a cam made by the machine that may be reproduced in quantities when the tool-moving cam is something like that shown in Fig. 13.

In all the views the same reference characters are employed to indicate similar parts.

In the embodiment of my invention shown in the drawings, 15 is a bed plate or base frame, upon which the machine is mounted, which may be supported at each corner, by legs 16, secured thereto by bolts 17, which pass through the lower horizontal web 18 of the bed plate.

Extending longitudinally of the base 15 are fixed guide cheeks 19—19, undercut in dove-tail fashion for a sliding guide for the carriage or head 20. The head 20 is provided with longitudinally extending cooperating, dove-tail surfaces 21, one on each side, and between the two, is a feather plate 22, held in adjusted position, by the gib screws 23. The gib screws are intended to take up any lost lateral motion between the parts 19 and 21. They are held in adjusted position by the check nuts 24.

Extending rearwardly from the central portion of the work carriage 20 is a threaded rod 25 which is slidable in the box 26 that is secured to the bed 15. The rod 25 passes through a web 27 in the bed, which is provided with a threaded hub 28. The inner end of the rod 25 is screw threaded, as at 29, and its longitudinal position may be adjusted with reference to the carriage by means of the nuts 30. Threaded on the rod 25 is a nut 31 which has a downward projecting axis with a roller 32 mounted thereon and which is included in a circumferentially extending groove 33 of the carriage moving cam 34. The cam 34 is mounted on a shaft 35 and secured thereto by a screw 36, that passes through the hub 37, or by other satisfactory means.

Now it will be manifest that when the shaft 35 is rotated, one revolution, the cam 34, cooperating with the roller 32 and the rod 25, will move the carriage 20 longitudinally of the bed 15 and the extent, velocity, character and time of movement of the bed, in a given revolution of the cam, will be dependent upon the inclination and character of the groove 33, therein. A downwardly depending hanger 38, from the bed 15, affords a bearing for the shaft 35, near the cam 34. The front end of the shaft finds bearing in the hollow hub 39, projecting from the end wall 40 of the bed 15.

The drawings show a carriage 20 upon which are mounted two separately adjustable work holding head stocks and all of the cooperating parts, each work holding head stock capable of presenting objects to be threaded to the milling cutters contained in the respectively cooperating tool head stocks 51.

The shaft 35 is extended beyond the hub 39 and secured to the end thereof is a worm wheel 41, driven by a worm 42 which is fastened on the transversely extending shaft 43. The shaft 43 is belted to a main drive shaft 44 and has supporting bearings in the standards 45 and 46, and is driven by the main drive belt 47. The belt 48 connects the pulleys 49 and 50 on the shafts 44 and 43, respectively.

The mechanism just described is that which is necessary to give the work carriages containing the work, to and fro movements towards and from the tools, the cam 34 operating as a means for graduating or controlling the time, extent and velocity of said movements.

A transversely movable tool head stock 51, is mounted upon an intermediate slide 52 and this slide has limited adjustable movement on a slide rest provided by the bed 15. Each of the heads comprises a bearing standard 53 and 54, in which a mandrel or spindle 55 has bearing. The mandrel 55, for carrying a tool 56, is supported in the bearings 53 and 54. The outer end of one of the mandrels carries a pulley 56$^b$ for a belt 57 that is used for driving a pump 58 for circulating the tool-and-work lubricating liquid. Pulleys 59 and 59' are secured to the respective mandrels and around the lower surface of these pulleys passes a belt 60 for rotating both pulleys in the same direction when a duplex machine is used.

The means for rotating the milling tool in the tool stock, or head is quite independent of the means for longitudinally moving the work carrying head stock, and the tool stock, heretofore described.

Each of the tool stocks 51, 51' is independently adjustable on the common intermediate slide plate 52 by means of the adjusting screws 61, 61', respectively. These screws perform the office of adjusting the tools 56 toward and from the work, to a greater or less extent, to determine the depth of the cut.

Secured to the shaft 35 is another cam, 62, serving as a cooperating means for imparting transverse movement to the intermediate slide 52 upon which both stocks are mounted, in the manner now to be described.

Pivoted in the bed 15, by a pin 63, is a vertically extending arm 64. The arm is ring-shape and enlarged, at its lower end, as at 65, which contains an inner projection 66. A spring 67 bears against one side of the enlarged end ring 65, and tends always to move and maintain the arm 64 to and in the position shown in full lines in Fig. 7, while the cam 62 tends to move the arm 64 in the opposite direction, the extent and time of the cam operating movement being governed or controlled by the radial enlargement and circumferential extension to a greater or less extent, of the cam portion 62$^b$. When the cam is rotated in the direction shown by the arrow in Fig. 7, the inclined leading end portion 68, of the cam, will engage the inner projection 66 and move the enlargement 65 of the lower portion of the arm 64 to the right, against the resilient action of the spring 67. This will move the upper end of the arm 64 to the left, on the pin 63.

Screws 70, 70' coaxially arranged, are threaded on the inner ends and pass through orifices made in the slide 52 and project into an opening 71 of the slide, into contact with the side faces of the upwardly projecting arm 64. The screws 70 and 70' are adjustable, axially, to determine the positions of the stocks 51, 51', with reference to the vertically disposed arm 64, so as to position the head stocks properly with respect to the laterally fixed work that is carried by the work carriages 20, and presented to the tools, in a manner hereinafter more specifically to be described. The screws 70 are secured in adjusted position by the nuts 73. A vernier disc 74 may be made rotatable with the screw 61, to indicate the extent of rotation thereof with reference to a fixed index 75 to visually indicate the extent of movement of the tool stock with reference to the slide upon which it is mounted.

Now, from the foregoing description, it will be manifest that when the shaft 35 is rotated one revolution, the cam enlargement 62$^a$, coming in contact with the inner projection 66 in the enlarged ring end 65 of the arm 64, will move the tool stocks 51, 51', and the slide 52, into position shown in dotted lines, in Fig. 7, and that when the abrupt termination or shoulder 62ᵇ of the cam passes the inner projection 66, the spring 67 will then quickly restore the parts to the positions shown in full lines in Fig. 7, and, it is also apparent that the enlarged part 62ᵃ of the cam 62, may be varied in configuration and in its circumferential presentation so as to control the position of the tool stock 51 and its time of movement with respect to the work presented to the tool, carried thereby, at any point in the revolution of the shaft 35, as for example, when the cam 62 has been formed, as shown in Fig. 13. When the cam is substantially the shape shown in Fig. 13, and the tool 56 takes the form indicated in Fig. 14, as an end milling tool 56ᵃ, then a cam 122ᵇ, indicated as the work, may be made with an inner groove 76, eccentric to the axial bore 77.

Any variation therefrom may be made by changing the face of the cam 62.

The thread milling tool shown as 56, in Fig. 2, is adapted to mill threads about the axial bore of a nut, bolt or stud, while the tool 56ᵃ, shown in Fig. 14, is adapted to mill grooves 76 in the side face of a cam blank 122ᵇ, the machine may thus be employed for a variety of work by adjusting the various parts and using the tool best adapted for the particular character of work to be accomplished. The character and configuration of the cams 34 and 62 may be varied or changed to suit the work in hand.

It is desirable to rotate the work, as well as the milling tool, and to this end, I have provided in the work carriage 20, a hollow mandrel, 78, to which is secured a worm wheel 79, rotatable by a worm 80. A transversely extending shaft 81 carries the worms 80 and 80' and finds bearings in the boxes 82, 82', constituting a part of the work carriage. On the outer end of the shaft 81 is a driving pulley 84, rotated by a belt 85, driven from the shaft 44. The hollow mandrel or sleeve 78 has an elongated bearing 86 in the work carriage 20, and has, on its outer end, adjustable nuts 87 to take up any lost axial movement thereof due to wear.

In front of the worm wheel 79, on the mandrel 78, is a slidable chuck member, or sleeve 88, having a limited slidable movement on the front end of the hollow mandrel 78. The chuck member 88 is provided with a series of tapered, flexible fingers 89, that are contracted to hold the work, when it is pressed into the fixed, tapering wearing plate 90. The plate 90 is secured in a part 91 of the carriage 20. A chuck moving fork 95, one for each of the slidable chuck members, is secured to a shaft 96 which finds bearing in the standards 97 constituting parts of the carriage, 20. At the center of the shaft 96 is secured an upwardly extending arm 98, by which the shaft 96 may be oscillated when the carriage 20 is moved. The arms 95, are on opposite sides of the chuck members 88, and project into the grooves 88ᵃ of each of the chucks, as indicated by 99 in Figs. 6 and 9. A rearwardly extending rod 100 passes through the upper perforated end 101 of the arm 98 and is adjustable therein by the screw threaded engagement therewith, of the nuts 102. The rear end of the arm is threaded, as at 103, for a nut 104, and passes through a bracket 105. An open helical spring 106, surrounds the rod 100, in front of the nut 104, and confronts an abutment 107 of the bracket 105 so that when the carriage 20 is moved forwardly, into the dotted line position, shown in Fig. 4, the spring is compressed to a greater or less degree, but its effect is sufficient to cause the arm 98 to be moved upon its pivotal shaft 96, and to move the chuck members 90 forward and force them into the wearing plates 91, to contract the fingers 89 to clutch the work that may have been moved from the hollow mandrel 78 into the chuck. When the carriage 20 is moved back into full line position, shown in Fig. 4, the chuck member 90 is thereby released and permitted to open the fingers 89 spring outwardly to release the work and permit it to pass through it. The rod 100, upon the rearward movement of the carriage 20, returns the upper end of the arm 98 to its full line position, for this purpose.

A work holding chute 110, is attached to the rear portion of the carriage 20, a section of which moves therewith, and consists of a bracket 111, having an axially extending opening 112, and a communicating, vertically extending opening 113, to serve as a conduit for the work. To the upper end of the bracket 111 is secured an extended chute 114, down which the work or objects to be machined, pass, by effect of gravity, into the opening 113 and subsequently into the axial opening 112. The bracket 111 is secured to the carriage 20 by the instrumentality of arms 114 and 115, and by cap screws 116, 117, respectively.

A standard 118, is secured to the rear portion of the fixed bed or frame 15 and a pipe 119 passes through and is fixed in the standard, by a screw 120. To the forward end of the pipe is secured a stationary enlargement or plunger 121, bored coaxially with the pipe, and fitting neatly within the axial opening 112, in the bracket 110. In the illustrated embodiment, a nut 122 is represented as the work or object to be tooled, and consists of the ordinary hexagon blank nut, without the thread. The nuts 122 are inserted in the chute 114 and fall by effect of gravity into the vertical opening 113 of the bracket 110. When the work carriage 20 is in its rearward position, shown in Fig. 4, the plunger 121 will prevent the bottom nut, in the vertical opening 113, from falling into the axial opening 112, within the bracket 110, and which opening is coaxially arranged with the opening in the hollow mandrel 78. When the work carriage 20 is moved forward, into the dotted line position shown in Fig. 4, so as to present the forward nut or work 122 to the tool 56, the plunger 121 remains stationary and an open space is left in the bore 112 ahead of the plunger, therefore, the nut 122$^a$, the bottom one in the vertical opening 113, of the bracket 110, will drop into the axial opening in the bore 112, because the vertical opening 113 is now moved forward sufficiently to permit the nut 122$^a$ to be contained in the axial opening in front of the plunger 121. Now after the threading operation has been performed upon the foremost nut 122, and the carriage is retracted by the cam 34, the nut upon which the work has been done, will have been pushed out from the work holding fingers 89 of the chuck, by the backward movement of the carriage, whereupon it will drop down upon the inclined guideway 123, and the cam 34, having made one revolution and returned the carriage will, thereupon, again advance the carriage so as to present the next succeeding nut 122, to the tool 56.

Now it is manifest that other work than nuts may be operated upon, by the mechanism heretofore described, and other functions than the production of threads within the bore of the work may be performed. For instance, in Fig. 14, I have shown a cam 122$^b$ and a side and end cutting milling tool 56$^a$, the cam as a substitute for the nut, and the tool 56$^a$ as a substitute for the milling tool 56, shown in the other figures of the drawings. This is illustrated only for the purpose of showing one deviation from the operations specifically described. There may still be other forms of work, for which the machine is capable, such for instance as the milling of detonators for shells and threading the same, and for other various and divers purposes.

In Fig. 12, I have shown a milling tool 123 in the general form of a special tap with concentric non-spiral teeth.

The parts 125 and 129 of cam 11 determine the pitch of the thread, cut by the tool. The part 127 may be used to vary the character of thread or cam-way cut by a suitable tool, while the part 130 returns the carriage to its normal position ready for another cycle of operation. In Fig. 10, the part 124′ corresponds in function to the part 124, in Fig. 11, while the part 125′ corresponds with the parts 125 and 129 for controlling the pitch of the thread when a milling tool, such as that indicated by 56, is employed, and the part 130′ corresponds with the part 130 of Fig. 11 to return the carriage 20. In this manner, threads of any desired character may be made, by the operation of my automatic milling machine.

If cam blanks, such as that shown by reference character 122$^b$, in Fig. 14, be placed in the chutes 114, 114′, instead of blank nuts 122, and a tool 56$^a$ be employed, instead of the tool 56, with corresponding variations in the cams 34 and 62, then the cams 122$^b$ may be automatically made in rapid sequence and automatically fed to the tool, in the same manner that the nuts are fed into the moving carriage 20, and presented for manipulation to the tool in a manner clearly apparent from the foregoing description.

The pipe 119, shown more clearly in Fig. 4, is connected to a hose or other conduit 131, which may lead to a reservoir for a liquid that may be used as a lubricant for the cutting tool. The liquid will pass through the pipe 119, and through the axial opening in the hollow mandrel 78, until it encounters the working tool and the object being worked upon, after which the liquid will fall into the pan, 132, from which it is pumped through the hose or pipe 133, by the pump 58 and the pipe 134, back to a suitable reservoir, which may be employed for the purpose, thus keeping the liquid in circulation and maintaining it at a low temperature, that is so essential for its proper and efficient use.

While I have herein shown a single embodiment of my invention, for the purpose of clear disclosure, it will be manifest to persons skilled in the art, that many changes may be made in the general arrangement and configuration of the parts, within the scope of the appended claims, and within the spirit of my invention.

Having described my invention, what I claim is:—

1. A machine of the character described, having in combination, a rotatable tool support; a work carriage having a hollow rotatable mandrel; a chuck at the work end of the mandrel; means at the other end of the mandrel to feed the work thereinto as the work is discharged at the tool end thereof; means to move the carriage toward and from the tool and means to close the chuck on the work by the forward movement of the carriage, and means to release the chuck by the retraction of the carriage.

2. A machine of the character described for threading bolt nuts having in combination, a rotatable tool support; a work carriage having a hollow rotatable mandrel to receive the nuts; a chuck at the work end of the mandrel to engage the forward nut; means, in cooperation with the mandrel, to feed the nuts to be tooled thereinto, when the said mandrel is axially moved in one direction, and to eject the finished nuts therefrom when it is moved in another direction; means to move the carriage toward and from the tool and means to close the chuck on a nut by the forward movement of the carriage and to release the chuck by the rearward movement thereof.

3. A machine of the character described for threading bolt nuts having in combination a rotatable tool support bodily movable in a plane at right angles to the axis of the tool; means to rotate the tool at a relatively high speed; a work holding carriage having a hollow rotatable mandrel; a chuck at the work end of the mandrel; means, in cooperation with the mandrel to feed a nut to be tooled thereinto, when the said mandrel is axially moved in one direction, and to eject a finished nut therefrom when it is moved in another direction; means to move the carriage toward and from the tool and means to close on the adjacent nut by the forward movement of the carriage and to release the nut by the retraction of the carriage.

4. A machine of the character described for threading bolt nuts having in combination a rotatable tool support; a tool stock carrying said tool support, movable in a plane transverse to the axis of the tool; a rotatable nut holding hollow mandrel; a carriage carrying said mandrel, movable axially with the mandrel toward and from the tool and a shaft carrying two cams, one for moving the carriage towards the tool and another cam for moving the tool stock transversely of the carriage movement and means carried by the mandrel to engage and to release a nut by advancing and retracting the carriage.

5. A machine of the character described for threading bolt nuts having in combination a base frame; a work carriage movable longitudinally thereon; a hollow rotatable mandrel, movable with the carriage; means to rotate the mandrel while the carriage is being moved; a tool stock movable in a direction across the path of movement of the carriage; means to move said carriage and said stock in timed relation and means carried by the mandrel to engage a nut by the forward movement of the carriage and to release the nut by retraction of the carriage.

6. A machine of the character described for threading bolt nuts having in combination a base frame; a work carriage movable longitudinally thereon; a hollow rotatable mandrel movable with the carriage; means to rotate the mandrel while the carriage is being moved; a tool stock carrying a rotating tool and movable in a direction across the path of movement of the carriage; cams on a common shaft, one to move said carriage and one to move said stock in timed relation and a chuck carried by the mandrel closed by the forward movement of the carriage and opened by the rearward movement thereof.

7. A machine of the character described for threading bolt nuts having in combination a base frame; a work carriage movable longitudinally thereon; a hollow rotatable mandrel movable with the carriage; chuck members movable with said carriage and cooperating with a relatively stationary part to close and open the chuck by advancing and retracting the carriage, respectively; means to rotate the mandrel while the carriage is being moved; a tool stock carrying a rotatable tool, movable in a direction across the path of movement of the carriage; means to move said carriage and stock in timed relation and means to admit a nut to be threaded into the hollow mandrel as the carriage is advanced to the tool.

8. In a machine of the character described for threading bolt nuts, a longitudinally movable carriage; a hollow mandrel rotatable thereon; a relatively stationary part having a bore registering with the bore of the mandrel and communicating with a vertical bore; a stationary plunger in said horizontal bore normally closing the vertical bore when the carriage is retracted and to open the vertical bore when the carriage is advanced to permit an object to drop from the vertically disposed bore into the horizontal bore and to push a corresponding object out of the operating end of said mandrel when the carriage is retracted said means operated by the axial movement of the carriage.

9. In a machine of the character described for threading nut bolts having in combination a base frame; a plurality of work carriages movable longitudinally thereon; a hollow rotatable mandrel having a chuck at its work discharging end, to hold the work, one in each carriage; a slide upon which the carriages are fixed; a plurality of tool holding head stocks for rotatable milling tools fixed to a transversely movable slide; means to move the carriage-carrying slide towards the tool stocks and means to move the slide, carrying the tool stocks, transversely of the path of movement of said carriages, said movements being made automatically in timed relation.

10. In a machine of the character described, a support, carrying a rotatable tool for milling threads; a thread cutting tool having a series of parallel, non-spiral thread-cutting teeth; a work carriage movable toward the tool, and a cam, for moving the carriage, having a part to advance the carriage toward the tool, a part to determine the pitch of the threads cut by the tool and a part to retract the carriage.

11. A machine of the character described having in combination a rotatable tool-carrying support; a rotatable work holding support; means to move the work toward the tool; means to move the tool at right angles to its axis into engagement with the work; means to again advance the work axially of the tool; means to return the tool to its former position; means to return the work to its former position; means to disengage the work from its support and means to engage another object upon which work is to be done, said devices arranged to produce the aforesaid movements in the sequential order mentioned during continual unidirectional rotation of the tool and work.

12. A machine of the character described having in combination a rotatable tool-carrying support; a rotatable work holding chuck; means to feed an object to be tooled to the chuck; means to close the chuck to hold the work; means to move the work toward the tool; means to move the tool transversely of its axis to engage the work; means to relatively move the tool and work axially of the tool; means to move the tool at right angle to its axis; means to return the axially moved member to its former position and means to open the chuck to disengage the work after said axial movement, said devices arranged and timed to automatically produce the aforesaid movements in the sequential order set forth and while the tool and work are being continuously rotated.

13. A machine of the character described having in combination a rotatable tool support; a tool stock carrying said support, movable in a plane transverse to the axis of the tool; a rotatable work holding support; a carriage carrying said work holding support movable axially with the support toward and from the tool; a shaft constantly rotating in one direction; two cams on the shaft, one for moving the carriage toward the tool and another for moving the tool transversely of the carriage movement and means to engage and release the work by the forward and rearward movement of the carriage.

14. A machine of the character described having in combination a plurality of separately adjustable, rotatable tool supports; means to move all said supports co-extensively and coincidently transverse to the axes about which the tools rotate; a plurality of rotatable work holding supports, one for each tool support; a carriage carrying said work supports and means for moving said carriage toward said tool supports and away from said tool supports and means for engaging and disengaging said work between the respective carriage movements, all said movements made automatically in proper timed relation.

In testimony whereof I hereunto subscribed my name.

JOHN G. FURLAN.